3,306,701
PREPARATION OF SELENIDES AND
TELLURIDES
James Thomson Anderson and Ronald Shepherd, Rugby,
England, assignors to Associated Electrical Industries
Limited, London, England, a British company
No Drawing. Filed May 23, 1963, Ser. No. 282,575
Claims priority, application Great Britain, May 31, 1962,
21,062/62
8 Claims. (Cl. 23—50)

This invention relates to the preparation of the selenides or tellurides of lead or other metals whose selenides and tellurides are substantialy insoluble in water and ammonia solution and whose compounds produced by the reaction of one of their soluble salts with solutions of ammonia are not substantially soluble in aqueous solutions of ammonia or ammonium compounds present or produced during the reaction.

It is known to prepare such selenides or tellurides by reacting the gaseous hydrides of selenium or tellurium with a solution of a suitable salt of the appropriate metal. It is also known, however, that these gaseous hydrides are not easy to prepare or isolate, that they are toxic, and that the hydrogen telluride and, to a slightly lesser extent, hydrogen selenide are unstable and decompose easily, especially in the presence of moisture or oxidizing substances so that the selenides or tellurides prepared in this way may be obtained in low yield and may be contaminated with undesired insoluble products such as free selenium or tellurium or their oxides as a result of such undesired decomposition.

It is known that ammonium selenide or telluride solutions prepared, for example, by the decomposition of a selenide or telluride of a metal such as aluminum by means of ammonia solution are more stable than the moist gaseous hydrides, especially if oxygen be excluded. Such solutions after clarification may be used to effect the formation of selenides or tellurides by reacting them with solutions of suitable salts of the appropriate metals which are capable of forming selenides or tellurides which are substantially insoluble in the resulting mixed solutions.

Such solutions of ammonium selenide or telluride have already been used to obtain the corresponding compounds of zinc and cadmium.

The method is unsuitable, however, when using salts of metals which may react with ammonia solution to produce compounds which are not substantially soluble in solutions of ammonia or ammonium compounds in that the desired selenide or telluride may become contaminated by the metal hydroxide or other undesired insoluble compounds.

It is the purpose of this invention to disclose a means of preparing the selenides and tellurides of lead and other metals substantially free from uncombined selenium or tellurium and from other insoluble compounds of the metal.

Acording to this invention, the reacting metal oxide or salt is dissolved in a selected compound or a solution of a compound to produce a solution which when reacted with the ammonium selenide or telluride solution will not permit the rapid formation of the metal hydroxide or other substantially insoluble derivative other than the desired metal selenide or telluride. Such a compound may be selected from suitable sequestering agents such as ethylene diamine tetracetic acid or N.hydroxyethyl ethylene diamine triacetic acid or suitable salts of these agents.

Alternatively the selenide or telluride source of selenium or tellurium such as aluminium selenide may be decomposed in suitable amines such as alkylene amines or alkanol amines or their solutions, the resultant solution, after clarification, being used in the same way as, but instead of, the ammonium selenide or telluride solutions already mentioned, by being added to a solution of the metal salt in the same amine or its aqueous solution or in a solution of a salt thereof or in any other suitable and convenient solvent.

A method is already known in which a lead salt, preferably the sulphate, is dissolved in a solution of an amine and in which the lead is later recovered by dilution of the solution or by the addition of carbon dioxide for the purpose of subsequently obtaining metallic lead in a purified condition.

It will be understood that the purity of the desired selenide or telluride will depend to a great extent on the purity of the original materials used and upon the ability of the chosen solvent compounds to retain in solution the products of the reaction other than the desired selenide or telluride.

Thus it is desirable that the solvent obtained by decomposition of the first selenide or telluride, acting as a source of selenium or tellurium, by ammonia or other base solution shall after clarification not contain any substances likely to give at later stages of the process any insoluble compounds other than the desired selenide or telluride. Similar limitations apply to the solutions of the metal oxides or salts. Similarly the solutions should be as free as possible from oxygen and oxidising substances and the reactions and filtrations and the washing and drying of the desired compounds should be conducted in an inert atmosphere such as a nitrogen gas atmosphere.

The temperatures of the solutions during preparation and during the reactions should, if necessary, be so controlled as to avoid decomposition of the reagents. Thus in the preparation of the soluble selenide or telluride solutions the reaction may be helped slightly by warming the ammonia or other base solution, but it may be necessary by means of internal or external cooling, particularly in the case of the telluride, to avoid excessive rise of temperature, especially in the early stages of the reaction, so as to avoid the formation of undue amounts of free selenium or tellurium, which, in addition to being wasteful, leads to greater difficulty in clarification of the solution.

The invention will be better understood from the following examples of carrying out the process.

*Example 1*

13 gm. of bismuth trioxide are dissolved in a solution of 20 gm. of ethlyene diamine tetracetic acid and 10 ml. of .880 ammonia solution in 200 ml. of water.

10 gm. of tellurium and about 4 or 5 gm. of aluminium are heated together and the resulting aluminum telluride decomposed in 90 ml. .880 ammonia and 90 ml. of water. After clarification this solution is added to the clear bismuth solution first prepared and the bismuth telluride precipitate is filtered, washed and dried. About 18 gm. of product is obtained.

All the operations are preferably carried out in an atmosphere of an inert gas such as nitrogen.

*Example 2*

17.0 gm. of lead monoxide are dissolved in a solution of 30 gm. of ethylene diamine tetracetic acid and 15 ml. of .880 ammonia solution in 300 ml. of water.

To this is added a solution of ammonium telluride as prepared in Example 1. The resulting lead telluride (yield about 21 gm.) is filtered, washed and dried as before.

*Example 3*

24 gm. of lead sulphate are dissolved in a solution consisting of 53.5 ml. of ethylene diamine hydrate made up to 100 ml. with water.

The telluride made by reacting together 10 gm. of tellurium and 4 to 5 gm. of aluminium is decomposed in a solution of 60 ml. each of water and ethylene diamine hydrate. After clarification this is added to the lead solution and the rest of the procedure is as usual. About 23 gm. of lead telluride is obtained.

What we claim is:
1. A method of preparing selenides and tellurides of lead and bismuth which comprises contacting a first solution comprising a first solute selected from the group consisting of the oxides and salts of lead and bismuth dissolved in a first solvent selected from the group consisting of ethylene diamine derivatives of acetic acid, alkylene amines and alkanol amines, and a second solution comprising a reactant selected from the group consisting of ammonium selenides and ammonium tellurides to precipitate the required product selected from the group consisting of lead selenide, lead telluride, bismuth selenide, and bismuth telluride.

2. A method according to claim 1, in which the ethylene diamine derivative employed is ethylene diamine tetracetic acid.

3. A method according to claim 1, in which the ethylene diamine derivative employed is N-hydroxyethyl ethylene diamine triacetic acid.

4. A method according to claim 1, in which ammonium selenide and ammonium telluride are prepared by decomposing the corresponding compound of aluminium in a strong solution of ammonia.

5. A method according to claim 1, in which the ammonium selenides and tellurides are prepared by decomposing the corresponding compound of aluminium in a solution of an amine selected from the group consisting of alkylene amines and alkanol amines.

6. A method according to claim 1, in which the first solvent comprises ethylene diamine.

7. A method as claimed in claim 1 wherein the precipitate product is separated from the solution in which it is formed.

8. A method according to claim 1 wherein the precipitate is filtered from the solution in which it is formed and subsequently washed and dried all in an inert atmosphere to prevent decomposition of the moist product.

References Cited by the Examiner
UNITED STATES PATENTS

| | | | |
|---|---|---|---|
| 2,767,049 | 10/1956 | Nitsche | 23—50 |
| 2,805,917 | 9/1957 | Nitsche | 23—50 |

OSCAR R. VERTIZ, *Primary Examiner.*

H. T. CARTER, *Assistant Examiner.*